US008539970B2

(12) United States Patent
Thomas et al.

(10) Patent No.: US 8,539,970 B2
(45) Date of Patent: Sep. 24, 2013

(54) DEVICE FOR TRANSFERRING A FLUID TO A SHIP, SHIP, TRANSFER SYSTEM AND ASSOCIATED METHOD

(75) Inventors: Pierre-Armand Thomas, Puteaux (FR); Jean-Pascal Biaggi, La Celle Saint Cloud (FR); Jean-François Patinet, Villefranche de Lonchat (FR)

(73) Assignee: Technip France (FR)

( * ) Notice: Subject to any disclaimer, the term of this patent is extended or adjusted under 35 U.S.C. 154(b) by 928 days.

(21) Appl. No.: 12/595,689

(22) PCT Filed: Mar. 31, 2008

(86) PCT No.: PCT/FR2008/050566
§ 371 (c)(1),
(2), (4) Date: Jan. 11, 2010

(87) PCT Pub. No.: WO2008/132417
PCT Pub. Date: Nov. 6, 2008

(65) Prior Publication Data

US 2010/0147398 A1 Jun. 17, 2010

(30) Foreign Application Priority Data

Apr. 12, 2007 (FR) ...................................... 07 54438

(51) Int. Cl.
*F16K 43/00* (2006.01)

(52) U.S. Cl.
USPC .................. 137/15.08; 137/615; 114/230.15; 141/387

(58) Field of Classification Search
USPC ................ 137/15.08, 615; 141/98, 387, 388, 141/383, 384; 114/230.15–230.19, 230.1; 414/137.9–138.2; 212/307–310; 193/17–21, 193/23
See application file for complete search history.

(56) References Cited

U.S. PATENT DOCUMENTS

| | | | | |
|---|---|---|---|---|
| 3,047,016 | A * | 7/1962 | Andresen | 137/615 |
| 3,228,421 | A * | 1/1966 | Sheiry | 137/615 |
| 3,249,121 | A * | 5/1966 | Bily | 137/615 |

(Continued)

FOREIGN PATENT DOCUMENTS

| | | |
|---|---|---|
| EP | A-1 324 944 | 7/2003 |
| FR | 2 824 528 A | 11/2002 |

(Continued)

OTHER PUBLICATIONS

International Search Report dated Oct. 30, 2008, issued in corresponding international application No. PCT/FR2008/050566.

*Primary Examiner* — Craig Schneider
*Assistant Examiner* — Craig J Price
(74) *Attorney, Agent, or Firm* — Ostrolenk Faber LLP

(57) ABSTRACT

The present disclosure comprises a platform and a manifold, the latter being intended to be connected to a fluid tank. The manifold comprises a length of rigid tube defining a pipe of approximately horizontal axis and a length of connecting tube for connection to a transfer line connected to the length of rigid tube. The length of connecting tube is permanently attached to the length of rigid tube and is hinged to the length of rigid tube to allow movement relative to the length of rigid tube between: —a retracted rest position in which the length of connecting tube extends entirely inside the inner edge; and —a first or filling position, in which the free end of the length of connecting tube projects out from the outer edge of the support platform.

15 Claims, 10 Drawing Sheets

(56) References Cited

U.S. PATENT DOCUMENTS

| | | | | |
|---|---|---|---|---|
| 3,651,832 | A * | 3/1972 | Meyer | 137/615 |
| 3,805,834 | A * | 4/1974 | Bily | 137/615 |
| 3,896,841 | A | 7/1975 | Bahlke | |
| 4,276,917 | A * | 7/1981 | Fujita | 137/615 |
| 4,299,262 | A * | 11/1981 | Andrepont | 137/615 |
| 4,393,906 | A * | 7/1983 | Gill | 137/615 |
| 6,637,479 | B1 * | 10/2003 | Eide et al. | 141/387 |
| 6,886,611 | B2 * | 5/2005 | Dupont et al. | 141/388 |
| 7,610,934 | B2 * | 11/2009 | Naciri et al. | 137/615 |
| 7,793,605 | B2 * | 9/2010 | Poldervaart et al. | 141/387 |
| 8,181,662 | B2 * | 5/2012 | Pollack et al. | 137/615 |

FOREIGN PATENT DOCUMENTS

| | | | |
|---|---|---|---|
| WO | WO 97/09513 | A | 3/1997 |
| WO | WO 98/08735 | A | 3/1998 |
| WO | WO 99/35031 | A | 7/1999 |
| WO | WO 01/34460 | A | 5/2001 |
| WO | WO 02/28765 | A1 | 4/2002 |
| WO | WO 03/004925 | | 1/2003 |

* cited by examiner

DEVICE FOR TRANSFERRING A FLUID TO A SHIP, SHIP, TRANSFER SYSTEM AND ASSOCIATED METHOD

CROSS REFERENCE TO RELATED APPLICATIONS

The present application is a 35 U.S.C. §371 National Phase conversion of PCT/FR2008/050566, filed Mar. 31, 2008, which claims benefit of French Application No. 07/54438, filed Apr. 12, 2007, the disclosure of which is incorporated herein by reference. The PCT International Application was published in the French language.

BACKGROUND OF THE INVENTION

The present invention concerns a device for transferring a fluid to a ship, of the type comprising:

- a support platform defining a support surface having an outer edge;
- a manifold disposed on top of the support surface and intended to be connected to a fluid tank located on the ship, the manifold comprising:
- a length of rigid tube having an outer end located facing the support surface, the length of rigid tube defining an inner pipe with approximately horizontal axis in the region of the outer end; and
- a length of connecting tube, attached to the length of rigid tube, the length of connecting tube having a free end capable of projecting beyond the outer edge in order to be connected to a first fluid transfer line, and defining an inner passage opening into the inner pipe and at the free end.

Such a device is applied in particular to the transfer of liquefied natural gas (LNG) between a transport ship and a storage installation for the product located at sea and/or an unloading installation for the product, known as a terminal.

In order to transport the liquefied natural gas between the production zones located at sea and storage areas located in the vicinity of the coast, it is known to load or unload tankers at sea, mooring the ship to a loading or unloading station at sea.

The stations comprise a gantry which carries a fluid transfer line. The line is formed for example by a plurality of rigid tubes hinged to one another or by a cryogenic flexible pipe suspended on the gantry. In the latter case, and in order to permit the loading of the LNG into the ship, or its unloading, the cryogenic flexible pipe must be connected to a loading pipeline, designated by the term “manifold”, of a tanker.

Taking into account the large number of tankers crossing the seas, it is known to provide a removable connector fitting on the one hand on the flexible pipe and on the other hand on the manifold of a particular ship.

The removable connector, when it is attached to the manifold, extends the latter beyond the outer edge of the ship. Thus it is possible to make the connection between the flexible pipe and the ship at a point located outside the ship, in particular when the flexible pipe assumes a “catenary” configuration, with its attachment end inclined upwards.

To this end, from EP-A-1 324 944 a transfer device of the aforesaid type is known in which the tubular connector is stored at rest on the loading or unloading installation for LNG at sea, and is then connected to the manifold of the ship by means of a crane, after the ship has been moored to the installation.

Since the connector is carried by the installation when it is not connected to the ship, no connecting device projects out from the side of the ship while it is navigating.

Such a device does not however give complete satisfaction. When the sea is rough, the relative movement of the ship with respect to the installation considerably impedes the fixing of the rigid tubular connector onto the manifold. The manoeuvring difficulties render the fluid transfer time-consuming and not very secure.

SUMMARY OF THE INVENTION

The aim of the invention is to provide a device for transferring a fluid between an installation for loading or unloading the fluid and a ship and which makes it possible to carry out in a rapid and safe manner the connection between the installation and the ship, even in the case of a rough sea, while allowing the ship to navigate without encumbrance when loading is completed.

To this end, the subject of the invention is a device of the aforesaid type, characterized in that the length of connecting tube is permanently attached to the length of rigid tube and is hinged onto the length of rigid tube in order to allow movement relative to the length of rigid tube between:

- a retracted rest position in which the length of connecting tube extends entirely inside the outer edge; and
- a first filling position, in which the free end of the length of connecting tube projects beyond the outer edge.

The device of the invention may comprise one or more of the following features, taken individually or in any technically possible combination:

- in the first filling position, the inner passage has an axis inclined downwards in the region of the free end of the length of connecting tube;
- the length of connecting tube is movable relative to the length of rigid tube approximately in a vertical plane between the rest position and the first filling position;
- the length of connecting tube is movable relative to the length of rigid tube approximately in a horizontal plane between the rest position and the first filling position, the manifold comprising a carriage for supporting the length of connecting tube, movably mounted on the support surface;
- the length of connecting tube is hinged on the length of rigid tube at a branching point located on the inside with respect to the outer end of the length of rigid tube, the length of rigid tube comprising an end extension of non-zero length extending between the branching point and the outer end, and the length of rigid tube has at its outer end an additional end-piece for connection to a second fluid transfer line, the inner pipe opening to the outside at the outer end;
- the length of connecting tube in its first filling position comprises a portion extending approximately parallel to the end extension of the length of rigid tube;
- the length of connecting tube is formed by a flexible hose, the flexible hose being flexible over approximately its entire length;
- the flexible hose is permanently attached to the outer end of the length of rigid tube, the length of connecting tube being capable of assuming a second filling position, in which the free end of the length of connecting tube extends approximately horizontally in the axis of the length of rigid tube;
- the length of connecting tube comprises a stiffening assembly added on to the flexible hose to limit its curvature in the region of the free end;

the stiffening assembly comprises a plurality of vertebrae hinged to one another by controlled articulations, the controlled articulations being capable of assuming a rest configuration in which the vertebrae are immobilised relative to one another and a release configuration in which the vertebrae are movable relative to one another; and the length of connecting tube comprises a rigid tubular element mounted to be movable on the length of rigid tube by means of an articulation means.

The invention also has as its subject a ship for transporting a fluid, characterized in that it comprises a fluid tank, and a transfer device such as defined above, the outer edge of the support platform defining at least partially the outer edge of the ship, the space below the free end of the length of connecting tube in its first filling position being completely clear.

The invention also has as its subject a fluid transfer system, characterized in that it comprises:

a fluid transfer installation located in contact with a stretch of water and comprising a fluid transfer line;

a ship as defined above, floating on the stretch of water, the transfer line being connected to the free end of the length of connecting tube.

The invention also has as its subject a method for transferring a fluid to a ship in an assembly such as defined above, characterized in that it comprises the following steps:

moving the ship towards the transfer installation, the length of connecting tube being in its retracted rest position;

positioning the ship facing the transfer installation and moving the length of connecting tube from its rest position to its first filling position; and connecting the transfer line of the transfer installation to the free end of the length of connecting tube.

BRIEF DESCRIPTION OF THE DRAWINGS

The invention will become clearer from the following description, provided solely by way of example and with reference to the appended drawings, in which.

DESCRIPTION OF PREFERRED EMBODIMENTS

Figure 1:
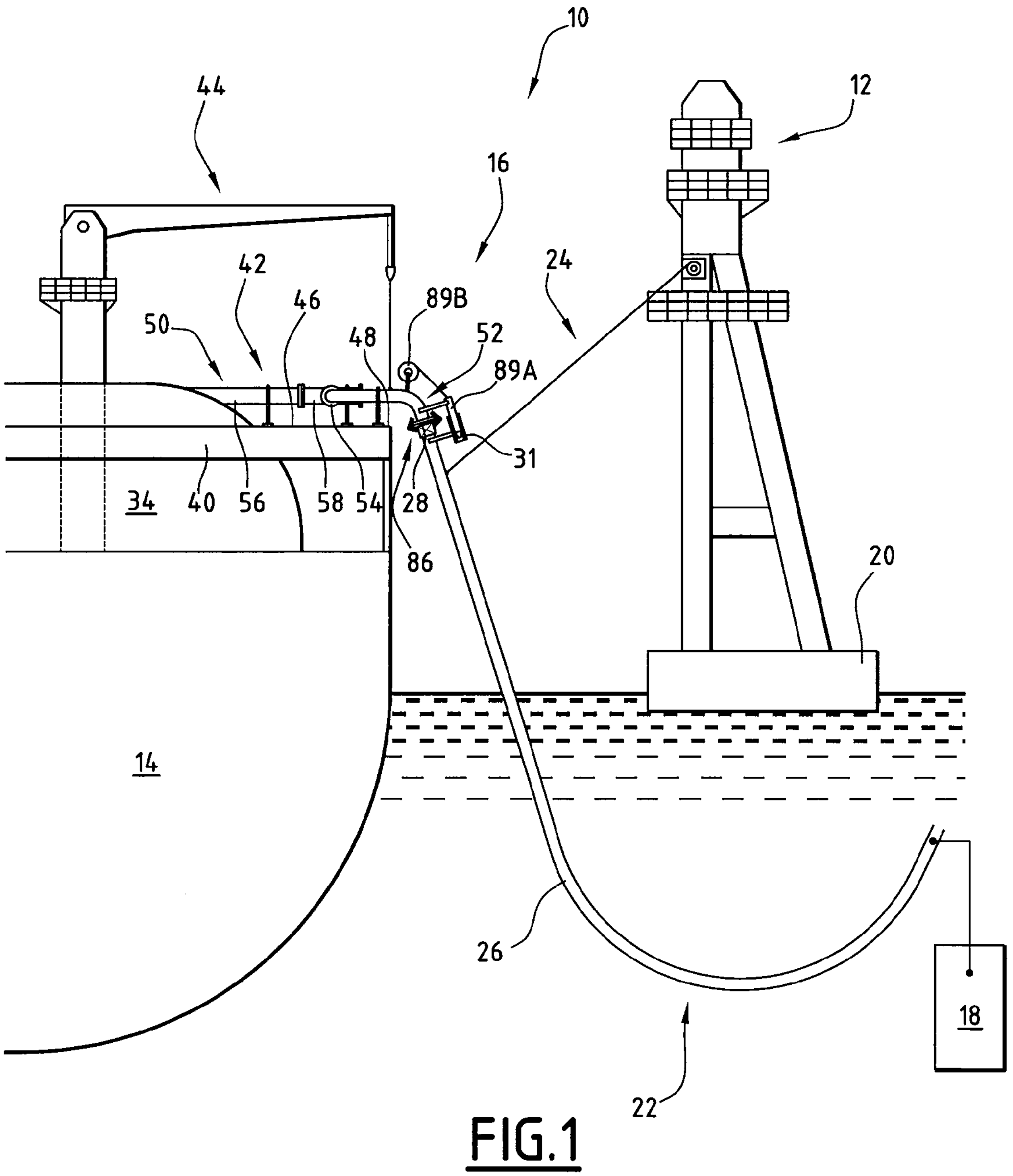
FIG. 1 is a schematic view in elevation of a LNG transfer system comprising a transfer device according to the invention connected to a first distribution installation having a flexible transfer pipe.
Figure 2:
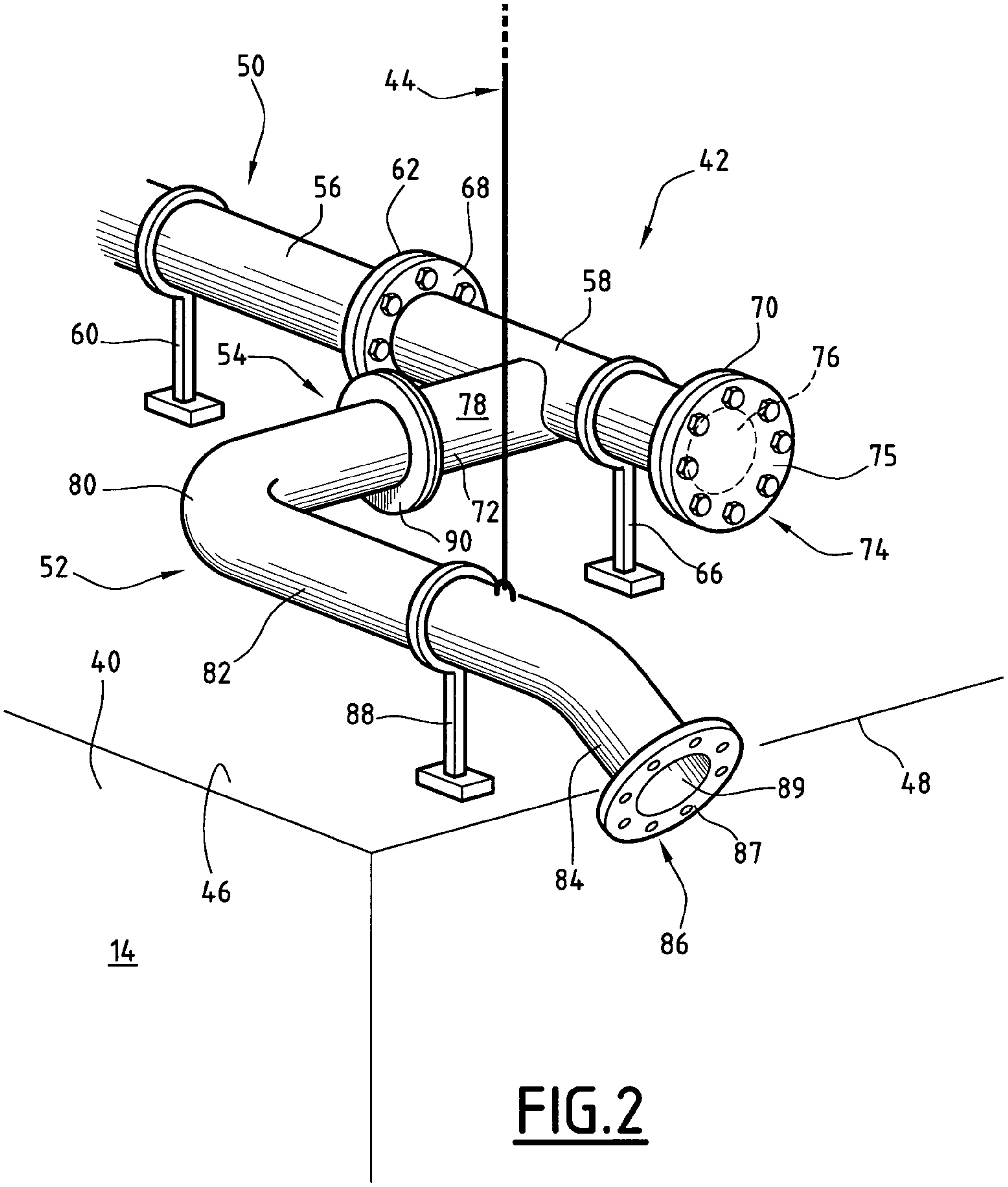
FIG. 2 is a perspective three-quarter front view of the manifold of the transfer device of FIG. 1, in a first filling position.
Figure 3:
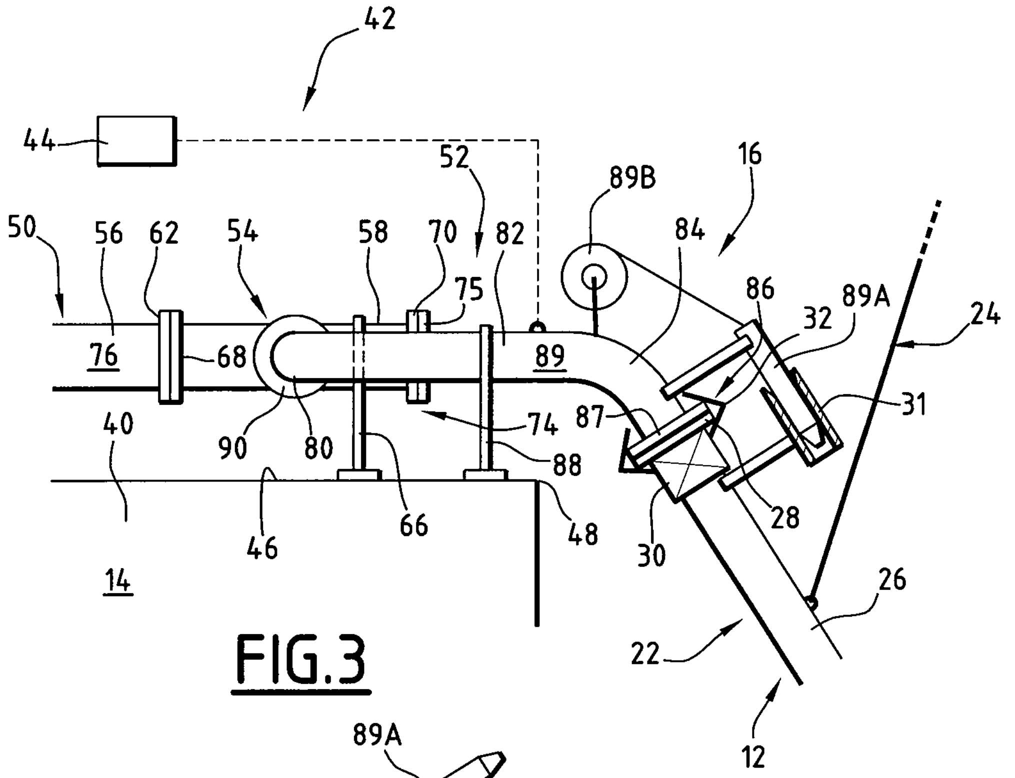
FIG. 3 is a side view of the transfer device of FIG. 1, during a fluid transfer.

A transfer system 10 for transferring a fluid, in particular a hydrocarbon consisting for example of liquefied natural gas (LNG), is shown in FIGS. 1 to 3.

The transfer system 10 comprises an installation 12 for the loading and/or unloading of LNG and which is located at sea, a ship 14 for the storage and regasification of the LNG, and a first transfer device 16 for transferring LNG between the installation 12 and the ship 14, carried by the ship 14.

The loading installation 12 comprises a LNG tank 18, a floating gantry 20 for unloading the LNG and a transfer line 22 formed, in the example shown in FIGS. 1 to 3, by a cryogenic flexible pipe connecting the tank 18 to the gantry 20. The installation 12 further comprises handling means 24 for manoeuvring the flexible pipe 22.

The tank 18 is suitable for collecting and storing LNG produced by LNG production plants. It is preferably located under the sea.

The floating gantry 20 carries the flexible pipe 22 via the handling means 24.

In this example, the flexible pipe 22 comprises a cryogenic pipe 26 equipped with a free end 28 for connection to the transfer device 16. The pipe is, for example, of the type developed and marketed by the company FLEXI FRANCE.

In a known manner, the free end 28 comprises a butterfly safety valve 30 of the type described in the application WO 03/004925, and a guide sleeve 31 connected to the cryogenic pipe 26 and extending parallel to the pipe 26 towards the ship 14 in the region of the free end 28. The free end 28 further comprises a connector 32 of the stirrup or clamp type, illustrated for example in EP-A-1 324 944.

The pipe 26 is in a "catenary" configuration between the gantry 20 and its free end 28.

The ship 14 comprises at least one LNG tank 34 disposed in its central part. Throughout the following, the terms "inner", "outer", "longitudinal", "transverse" "front", "rear", "left", "right", "horizontal" and "vertical" are to be understood as in relation to the ship 14.

As illustrated in FIGS. 1 and 2, the transfer device 16 comprises an approximately horizontal loading platform 40, at least one manifold 42 which extends supported on top of the platform 40, and means 44 for handling the manifold 42 and formed by a crane.

The loading platform 40 is integral with the deck of the ship 14. It has an approximately horizontal support surface 46 on which the manifold 42 is supported. The support surface 46 is bounded by an outer lateral edge 48 which partially defines the outer lateral edge of the ship 14. Thus, no part of the ship 14 projects out beyond the lateral edge 48 of the platform 40. The space delimited downwards and towards the outside of the ship by the outer edge 48 of the platform 40 is therefore totally clear.

According to the invention, the manifold 42 includes a length of rigid tube 50, extending opposite the support surface 46, and a length of connecting tube 52 for connection to the transfer line 22 and hinged onto the length of rigid tube 50 via articulation means 54.

As illustrated in FIGS. 2 and 3, the length of rigid tube 50 extends along a transverse axis X-X' of the ship. It has an inner tubular element 56 connected to the tank 34 and an outer tubular element 58 onto which the length of connecting tube 52 is hinged.

The inner tubular element 56 extends transversely relative to the ship, on the inside in relation to the outer edge 48. It has an inner support leg 60 fixed onto the upper surface 46 and, at its outer end, a flange 62 for attaching the outer tubular element 58.

The outer tubular element 58 is equipped with an outer support leg 66 permanently attached to the surface 46. The element 58 extends between an inner flange 68 fixed onto the fixing flange 62 of the inner element 56, and an outer flange 70 forming an end-piece for connection to a second fluid transfer line, as will be seen hereinafter. The element 58 further comprises a lateral branching 72 for the attachment of the length of connecting tube 52.

The outer flange 70 extends at the outer end 74 of the length of rigid tube 50. It extends in an approximately longitudinal vertical plane in relation to the ship, inside the outer edge 48. Thus, the flange 70 is located opposite the upper surface 46, set back from the outer edge 48.

The flange 70 is adapted to receive a complementary flange of a rigid LNG transport line, as will be described hereinafter.

A plug 75 is screwed onto the flange 70 at the outer end 74 when the flange 70 is not connected to a transport line.

The tubular elements 56 and 58 delimit internally a hydrocarbon flow pipe 76, with axis X-X'. The pipe 76 connects the tank 34 to the outer end 74 through which it opens out.

The branching 72 extends approximately perpendicularly to the axis X-X'. It delimits an inner opening 78 which opens into the pipe 76. The lateral branching 72 connects the length of rigid tube 50 to the articulation means 54.

The length of connecting tube 52 is permanently attached to the length of rigid tube 50 at the free end of the branching 72. It therefore defines, on the length of rigid tube 50, an end extension of non-zero length extending between the branching 72 and the free end 74.

In this example, the length of connecting tube 52 is formed by a rigid tubular element which comprises an inner elbow 80 connected to the articulation means 54, an intermediate tubular portion 82 and an outer elbow 84 having a free end 86 equipped with a flange 87 intended to receive the flexible pipe 22.

The inner elbow 80 connects the articulation means 54 to the intermediate portion 82.

The intermediate portion 82 is equipped with a retaining leg 88 intended to bear on the support surface 46. It extends approximately parallel to the axis X-X' when the leg 88 is arranged bearing on the support surface 46.

The outer elbow 84 extends approximately in a vertical plane. It is inclined downwards in the region of the free end 86 when the leg 88 bears on the surface 46.

The length of connecting tube 52 defines an inner passage 89 for the flow of hydrocarbons. The passage 89 opens into the opening 78 via the articulation means 54 in order to connect to the pipe 76. The passage 89 also opens out at the free end 86.

The length of connecting pipe 52 is equipped, in the region of its free end 86, with a guide rod 89A intended to be introduced into the guide sleeve 31, and with a winch 89B for pulling the free end 28. The rod 89A extends approximately parallel to the axis of the passage 89.

The articulation means 54 comprise a revolving joint 90 with longitudinal axis Y-Y'.

The revolving joint 90 connects the elbow 80 to the branching 72 so as to be rotatable about the axis Y-Y'.

Figure 5:
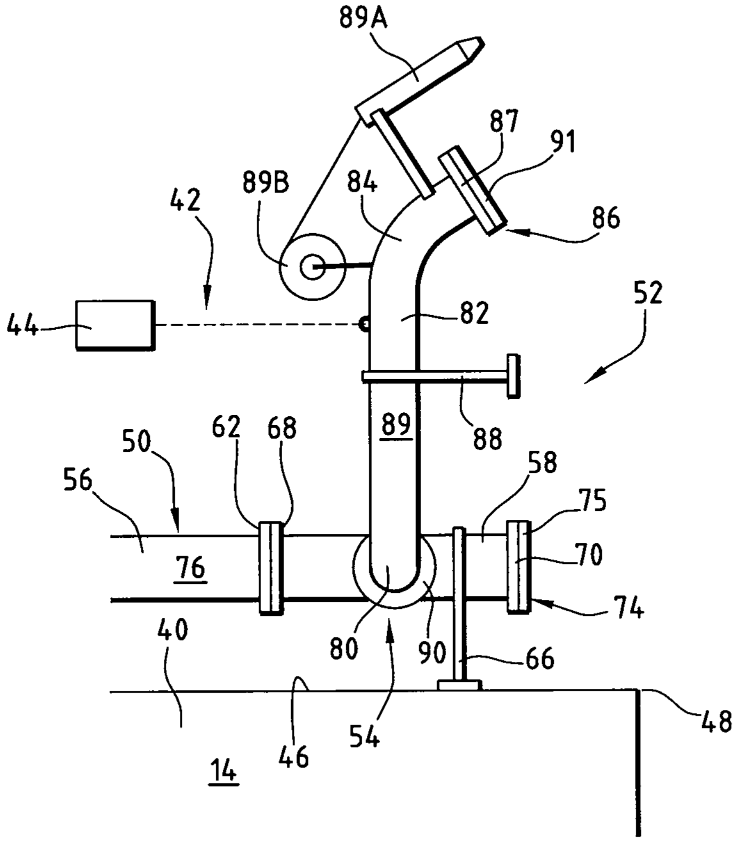
FIG. 5 is a view similar to FIG. 3, during navigation of the ship, after the transfer.

According to the invention, the length of connecting tube 52 is mounted to be movable in rotation about a longitudinal horizontal axis Y-Y', between a retracted rest position, shown in FIG. 5, and a first filling position shown in FIGS. 2 and 3. The length of connecting tube 52 thus moves approximately in a vertical plane.

In the rest position shown in FIG. 5, the length of connecting tube 52 extends approximately vertically opposite the support surface 46. It is thus disposed entirely inside the outer edge 48. No part of the length of connecting tube 52 projects out beyond the outer edge 48.

In the rest position, the elbow 80 and the intermediate tubular portion 82 extend in an approximately vertical plane, and the outer elbow 84 is inclined upwards and towards the outside. The leg 88 protrudes externally away from and above the support surface 46. A bearing abutment (not shown) integral with the platform 40 is provided in order to wedge the length of connecting tube 52. A plug 91 is then fixed onto the flange 87 to block the passage 89 towards the outside.

In the first filling position shown in FIG. 3, the length of connecting tube 52 has been pivoted downwards and towards the outside about the axis Y-Y'. In this position, the leg 88 is arranged so as to bear on the support surface 46. The outer elbow 84 projects outside in relation to the outer edge 48 of the platform 40 so that its free end 86 extends opposite the stretch of water on which the ship is floating. The plug 91 has been removed to free the passage 89.

In this position, the inner elbow 80 and the intermediate portion 82 extend in a plane approximately parallel to the support surface 46, above the surface 46. The intermediate portion 82 extends parallel to the axis X-X'. The outer elbow 84 is inclined downwards and the passage 89 opens out inclined downwards, at the free end 86.

The operation of the transfer system 10 according to the invention will now be described.

Initially, and as shown in FIG. 5, the ship 14 approaches the loading installation 12 to be positioned opposite the installation 12. During this movement, the length of connecting tube 52 of the manifold 42 is disposed in its rest position, in which it is retracted in register with the support surface 46 of the platform 40. Thus, no part of the manifold 42 projects beyond the lateral edge 48 of the platform 40.

Then, when the ship 14 is opposite the installation 12, as shown in FIG. 1, it is immobilised by anchoring.

The crane 44 for handling the manifold 42 is then actuated in order to bring the length of connecting tube 52 from its rest position to its first filling position.

To this end, the length of connecting tube 52 is pivoted downwards about the longitudinal axis Y-Y' until the leg 88 abuts against the support surface 46 of the platform 40. The free end 86 then projects beyond the outer edge 48, while being inclined downwards. This configuration of the length of connecting tube 52 is particularly adapted to receiving a flexible pipe 22 in the shape of a catenary.

The means 24 for handling the flexible pipe 22 are then actuated in order to bring the free end 28 of the flexible pipe 22 opposite the free end 86 of the length of connecting tube 52.

Then, the ends 86, 28 are connected to each other by means of the guide means 31, 89A, 89B provided respectively on the pipe 26 and on the length of connecting tube 52.

To this end, the winch 89B is used to pull the free end 28 towards the free end 86, and the guide rod 89A penetrates into the sleeve 31 to index the relative movement of the ends 28, 86 towards each other.

The LNG is then transported continuously from the underwater tank 18 through the cryogenic pipe 26, the passage 89 provided in the length of connecting tube 52, the opening 78 defined by the lateral branching 72 and the pipe 76 defined inside the length of rigid tube 50, to the tank 34 in the ship.

In an emergency, the emergency disconnection valve 30 releases the free end 28 of the cryogenic pipe 26 with respect to the free end 86 of the manifold 42.

In addition, the space below the pipe 26 is completely clear, so that the pipe 26 does not abut against a part of the ship 14, even if it is not retained by the handling means 24.

When the loading of the hydrocarbons into the tank 34 is completed, the free end 28 of the flexible pipe 26 is disconnected from the free end 86 of the length of connecting tube 52.

The length of connecting tube 52 is then moved from its first filling position to its rest position by means of the handling crane 44.

The manifold 42 opens out at the free end 86 of the length of connecting tube 52 and at the outer end 74 of the length of rigid tube 50. It is therefore equally suitable for being connected to loading installations 12 having a flexible transfer pipe 22 by the free end 86, or to installations 12 having an articulated arm, comprising rigid elements hinged to one another, by the outer end 74.

Figure 4:
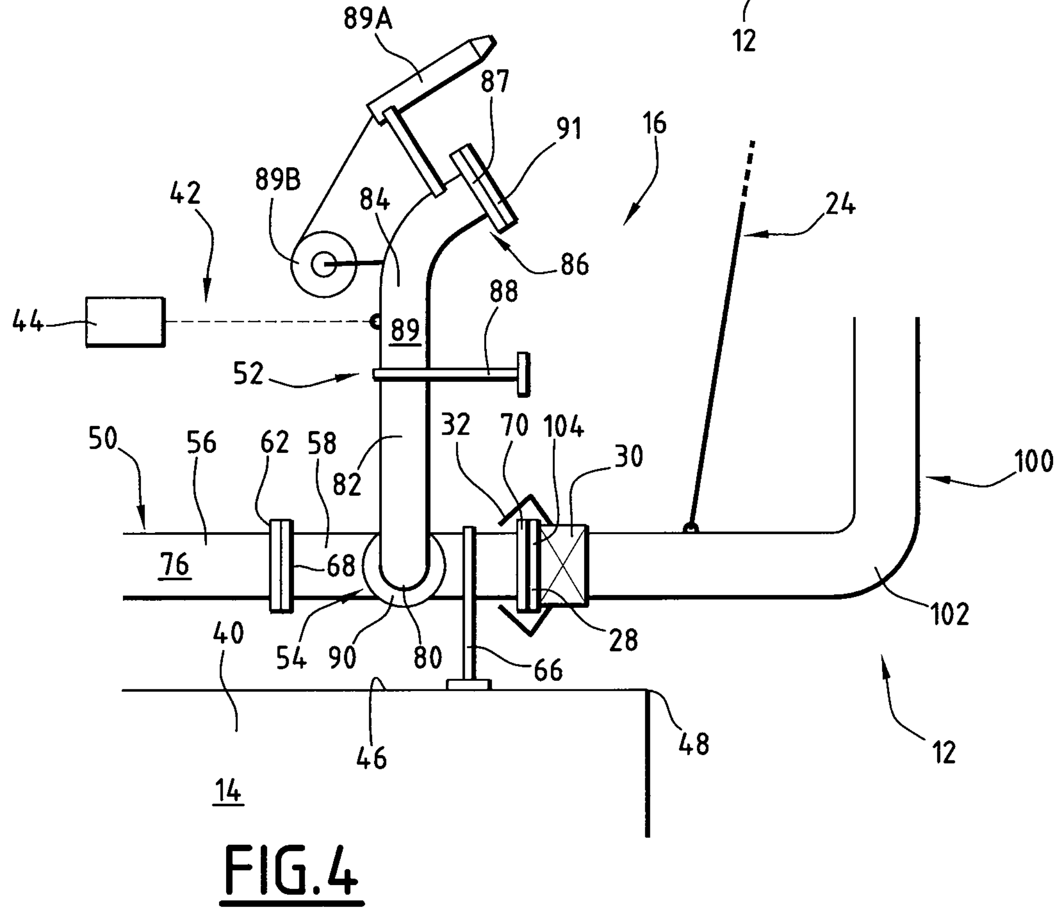
FIG. 4 is a view similar to FIG. 3 during a transfer carried out from a second installation equipped with a transfer line formed by rigid elements hinged to one another.

Thus, in the variant shown partially in FIG. 4, the installation 12 comprises an articulated loading arm, formed by a plurality of rigid elements 100 hinged to one another on the gantry 20.

The rigid elements comprise a tubular connecting element 102 which extends approximately horizontally during its connection to the manifold 42 of the ship. The element 102, at its free end, has a connecting flange 104 which extends in a vertical plane approximately perpendicular to the transverse axis X-X' of the ship 14.

In order to make the connection between the manifold 42 and the rigid connecting element 102, the outer flange 70 of the outer tubular element 58 is used after removal of the plug 75. To this end, the connecting flange 104 is brought opposite the outer flange 70 and is screwed onto the flange 70. Then, the LNG is loaded onto the ship 14 via the pipe 76.

During this operation, the length of connecting tube 52 is maintained in its retracted rest position. The plug 91 blocks the passage 89.

Figure 6:
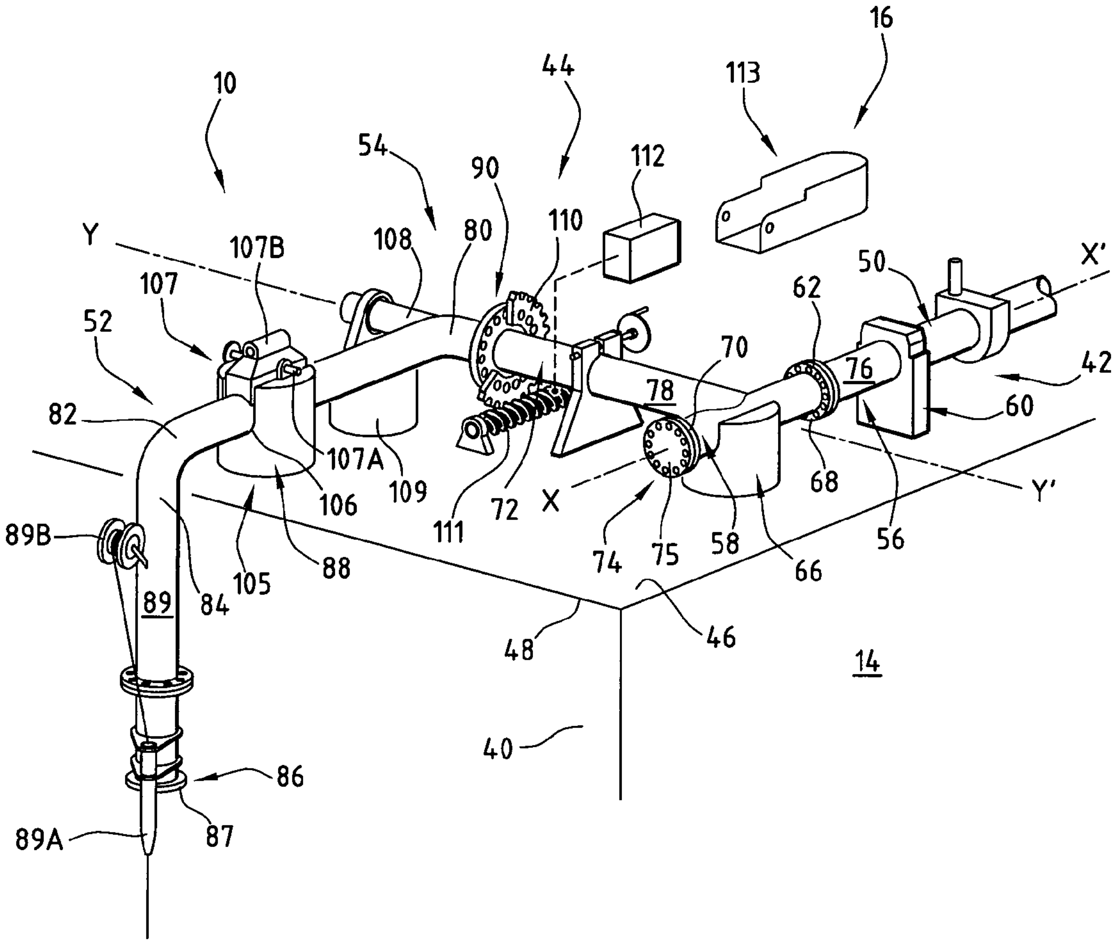
FIG. 6 is a perspective view of a variant of the first transfer device.

A variant of the first transfer device 10 is shown in FIG. 6.

Differing from the transfer device shown in FIGS. 1 to 5, the leg 88 comprises a support block 105 integral with the support surface 46 and delimiting a groove 106 for receiving the length of connecting tube 52.

The leg 88 further comprises a locking cap 107 welded onto the portion 82. The cap 107 has in addition an upper head 107B made of rubber.

When the length 52 is in its first filling position, a pin 107A is removably engaged through the block 105 and the cap 107 in order to lock the length of connecting tube 52 in position in the groove 106.

The articulation means 54, in addition to the revolving joint 90, comprise a rotating shaft 108 with longitudinal axis Y-Y', added onto the length of connecting tube 52. The shaft 108 projects longitudinally from the inner elbow 80, on the opposite side from the branching 72. The rotating shaft 108 is rotatably received in a tripod 109 integral with the support surface 46.

Differing from the transfer device 16 shown in FIGS. 1 to 5, the handling means 44 comprise a rotatable toothed pinion 110, an endless screw 111 meshing on the rotatable pinion 110 to drive it in rotation, and a drive means 112 of the hydraulic, pneumatic or electric drive type capable of being actuated by an operator present on the platform 40.

The rotatable pinion 110 is integral with the length of connecting tube 52 and is movable together with the length of tube 52 about the axis Y-Y'.

It is fixed on the length of tube 52 in the region of the revolving joint 90 and extends in a transverse vertical plane.

The screw 111 is mounted to be rotatable relative to the platform 40 about a transverse axis. It is mechanically connected to the drive means 112. The actuation of the drive means 112 drives the endless screw 111 about its axis and, consequently, the rotatable pinion 110 about the axis Y-Y'.

The transfer device 16 further comprises a housing 113 for retaining the length of connecting tube 52 in its retracted rest position. The housing is fixed on the support surface 46 on the opposite side from the leg 88 in relation to the axis Y-Y'.

The operation of this variant is similar to that of the first transfer device 16.

In its retracted rest position, the length of connecting tube 52 has been pivoted through around 180° about the axis Y-Y' and is received in the retaining housing 113 on the opposite side from the leg 88. To this end, the intermediate portion 82 extends parallel to the support surface 46 and the outer elbow 84 projects upwards. The upper head 107B made of rubber bears in the retaining housing 113.

The length of connecting tube 52 is thus located entirely inside the outer edge 48.

When the length of connecting tube 52 has to be brought into its first filling position, an operator actuates the drive means 112 and thus rotates the endless screw 111 about its transverse axis.

The rotation of the screw 111 causes the rotatable pinion 110 to be rotated about the axis Y-Y' and consequently causes the length of connecting tube 52 to be rotated about the axis Y-Y' via the revolving joint 90.

When the length of tube 52 has turned outwards through around 180°, the intermediate portion 82 is received in the groove 106 and abuts against the support block 105.

The pin 107A is then introduced into the cap 107 above the intermediate portion 82 and into the block 105 in order to lock the length of connecting tube 52 in the leg 88 and block the groove 106 in an upward direction.

During the rotation of the length of tube 52, the shaft 108 guides and supports the length of connecting tube 52 in the region of the inner elbow 80, thereby facilitating its movement and rendering the transfer device 16 reliable.

Figure 7:
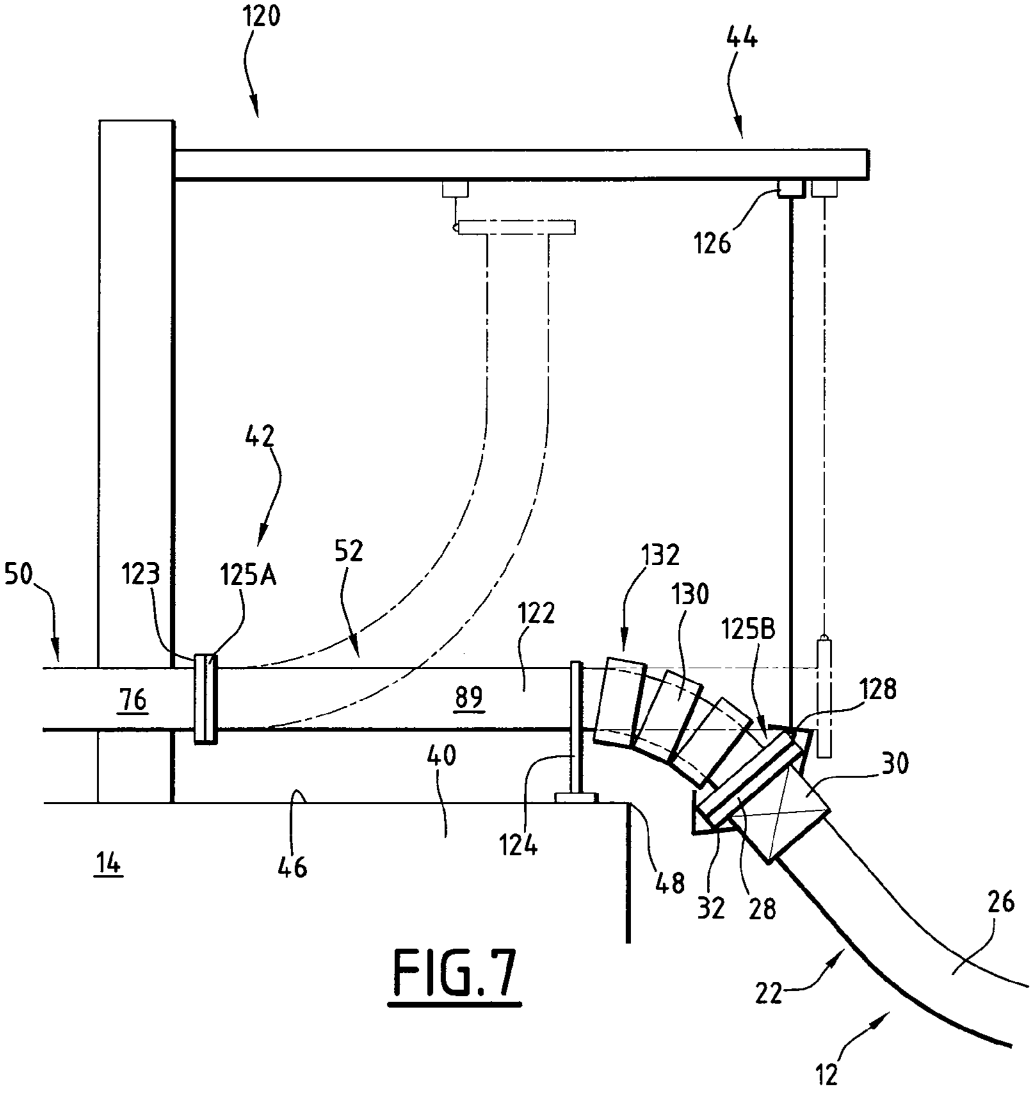
FIG. 7 is a view similar to FIG. 3 of a second transfer device according to the invention.

A second transfer device 120 according to the invention is shown in FIG. 7. Contrary to the first transfer device 16, the length of rigid tube 50 of the transfer device 120 is devoid of any outer tubular element 58 opening out at an outer end.

The length of connecting tube 52 is formed by a tubular flexible hose 122 permanently attached to the outer end 123 of the length of rigid tube 50.

The inner filling pipe 76 opens out only towards the outside in the flexible hose 122.

The platform 40 comprises a support clamp 124 integral with the support surface 46, disposed in the region of the outer edge 48, and capable of supporting the flexible hose 122 so that the latter extends along the axis X-X' between the outer end 123 and the clamp 124.

The flexible hose 122 comprises a fixed end 125A, integral with the outer end 123 of the length of rigid tube 50 and a free end 125B, movable by twisting the flexible hose 122 about its fixed end 125A by means of the handling crane 44. In this example, the flexible hose 122 and the manifold 42 open towards the outside only at the free end 125B.

The crane 44 thus comprises a winch 126 movable transversely relative to the ship 14 above the flexible hose 122. The winch 126 comprises an end hook 128 fixed on the free end 125B and movable towards the winch 126, along an approximately vertical axis.

The free end 125B of the flexible hose 122 is thus movable between a first filling position, intended to receive the free end 28 of a cryogenic pipe 26, a second filling position intended to receive the free end 104 of an articulated loading arm 100, and a retracted rest position to allow navigation of the ship by twisting the flexible pipe 122 into an approximately vertical plane.

In the rest position, the free end 125B has been brought near the winch 126, above the platform 46 and the fixed end 125A. The flexible hose 122 is curved upwards and is located entirely inside the outer edge 48.

In the first intermediate filling position, the flexible hose 122 is disposed so as to bear on and be locked upwards on the clamp 124 in order prevent its movement. The flexible hose 122 then, by deformation, has an area bent downwards in the region of its free end 125B which projects beyond the outer edge 48 of the platform 40.

In the second filling position, the flexible hose 122 is held linearly along the axis X-X' by the winch 126. The flange located at the free end 125B extends in an approximately vertical plane, in order to facilitate the connection of an articulated arm 100.

The connection of the manifold 42 to the loading installations 12 is otherwise similar to that described for the first transfer system 10.

As a variant, sleeves 130 forming a stiffening assembly 132 are disposed around the flexible hose 122, in the region of the free end 125B, in order to limit the maximum curvature of the flexible hose 122 between the clamp 124 and the free end 1252 in its first filling position.

The sleeves 130 may be fitted into one another or connected by a rigid element in order to assume a horizontal configuration with axis X-X' and hold the flexible hose 122 in its second filling position.

Figure 8:
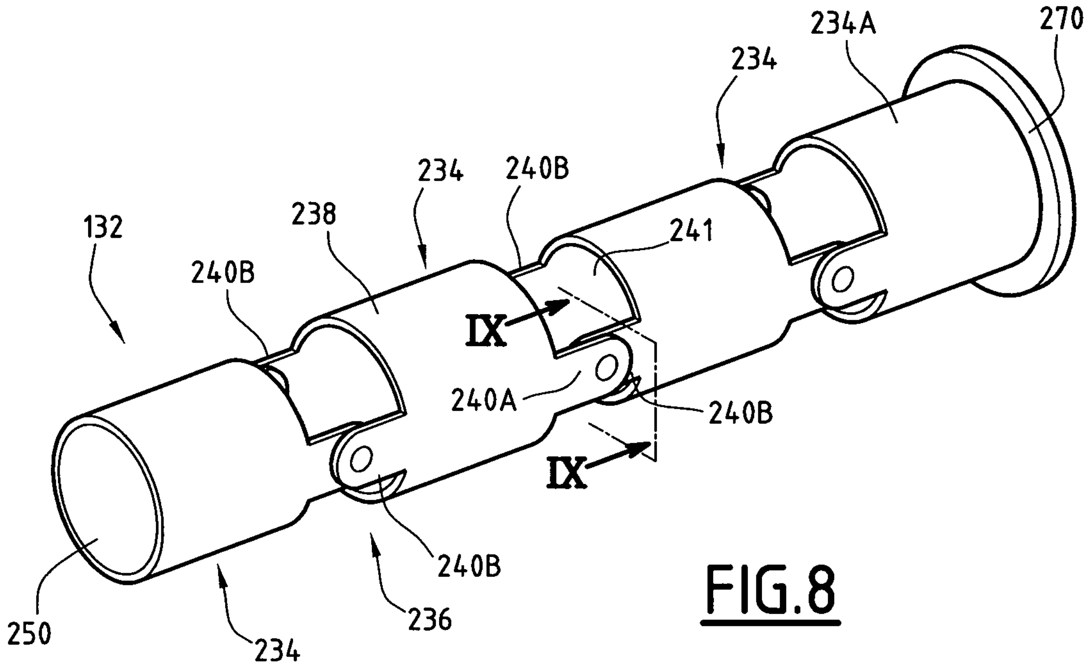
FIG. 8 is a perspective view from above of a stiffening assembly for a length of flexible tube of the second transfer device.
Figure 9:
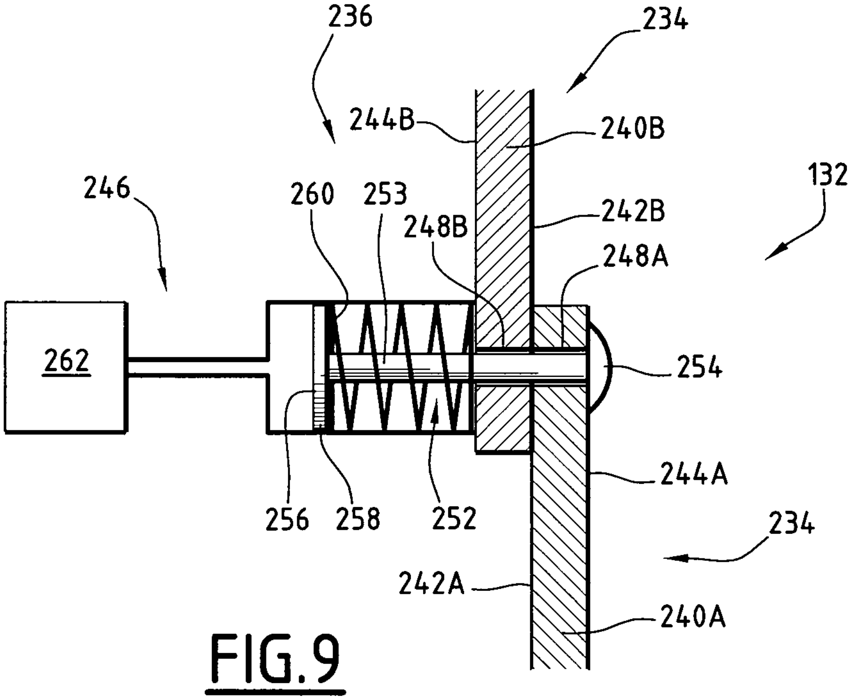
FIG. 9 is a partial view in section along the plane IX-IX of a detail of the stiffening assembly of FIG. 8.

In another variant shown in FIGS. 8 and 9, the stiffening assembly 132 comprises a plurality of hollow rigid vertebrae 234 articulated end to end by controllable articulations 236.

Each vertebra 234 comprises a hollow sleeve 238 with transverse axis extended at its outer and inner ends by two pairs of axial lugs 240A, 2402.

The lugs 240A, 2402 project relative to the sleeve 238 on either side of its axis. The lugs 240A, 240B of each pair are disposed opposite each other and, by moving about the axis of the sleeve 238, delimit two notches 241 opening out axially.

As will be seen hereinafter, the outer lugs 240A of each sleeve 238 are held, at rest, against the inner lugs 2402 of an adjacent sleeve 238 by the controllable articulations 236.

Thus, as illustrated in FIG. 9, each lug 240A, 240B has a bearing face 242A, 242B bearing on the other lug 240B, 240A, respectively, a free face 244A, 244B opposed to the bearing face 242A, 242B, respectively, and a through opening 248A, 248B for the passage of the articulation 236 opening into the faces 242A, 242B, 244A, 244B.

The sleeves 238 and the lugs 240A, 240B of the vertebrae 234 delimit on the inside an opening 250 for receiving the flexible hose 122 and into which is inserted an outer portion of the flexible hose 122 located in the region of the free end 125B.

As illustrated in FIG. 9, the controllable articulations 236, for each pair of lugs 240A, 240B bearing one against the other, comprise a rod 252 for articulating and holding the lugs 240A, 240B, and a jack 246 for controlling the rod 252.

The rod 252 comprises a central portion 253 engaged through the through openings 248A, 248B of the lugs 240A, 240B, a clamping head 254 applied to a free face 244A of a first lug 240A and an actuating head forming a piston 256 of the jack 246.

The jack 246, besides the piston 256, comprises a chamber 258 fitted on the free face 244B of a second lug 240B, a spring 260 for urging the clamping head 254 towards the free face 244A, and a hydraulic assembly 262 for moving the piston 256 towards the free face 244B.

The chamber 258 slidingly receives a part of the central portion 253 and the piston 256. In addition it receives the spring 260 which is interposed, bearing between the piston 256 and the free face 244B of the second lug 240B.

Each controllable articulation 236 is capable of being actuated between a rest configuration, in which the lugs 240A, 240B are immobilised with respect to each other in order to prevent the relative movement of two adjacent vertebrae 234, and a release configuration, in which the lugs 240A, 240B are released to permit the relative movement of two adjacent vertebrae 234 by pivoting about the rods 252.

In the rest configuration, the hydraulic assembly 262 is inactive. The spring 260 holds the clamping head 254 against the free face 244A, in order to clamp the lugs 240A, 240B between the clamping head 254 and the spring 260. The bearing faces 242A, 242B are then firmly fitted one against the other in order to prevent movement of the vertebrae 234.

In the release configuration, the hydraulic assembly 262 is actuated. It exerts a force on the piston 256 in opposition to the spring 260, thereby moving the clamping head 254 away from the free face 244A. The bearing faces 242A, 242B are then free to move relative to each other, thereby permitting the pivoting of the vertebrae 234 about the rods 252.

The stiffening assembly 132 is therefore capable of selectively maintaining the flexible hose 122 in its first, downwardly inclined, filling position, or in its second, horizontal, filling position, when the controllable articulations 236 are in their rest configuration.

In order to bring the flexible hose 122 into one or the other of its first and second positions, the controllable articulations 236 are brought into their release configuration by actuating the hydraulic assemblies 262. The vertebrae 234 are then moved, together with the flexible hose 122, to the desired position, before the deactivation of the hydraulic assemblies 262.

In the embodiment of FIGS. 8 and 9, the rods 252 are all parallel to the same approximately horizontal direction, thereby allowing movement of the flexible hose in a vertical plane perpendicular to that direction. As a variant, the rods 252 at the ends of at least one vertebra 234 may be brought parallel to at least two different directions in order to permit movement of the flexible hose 122 in at least two planes.

In another variant, a revolving joint 270 is interposed between the flexible hose 122 and an end vertebra 234A. The vertebrae 234 are then movable in rotation relative to the flexible hose 122 about the axis of the flexible hose 122, by means of the revolving joint 270, in order to permit the movement of the flexible hose 122 by twisting in any plane about its axis.

Figure 10:
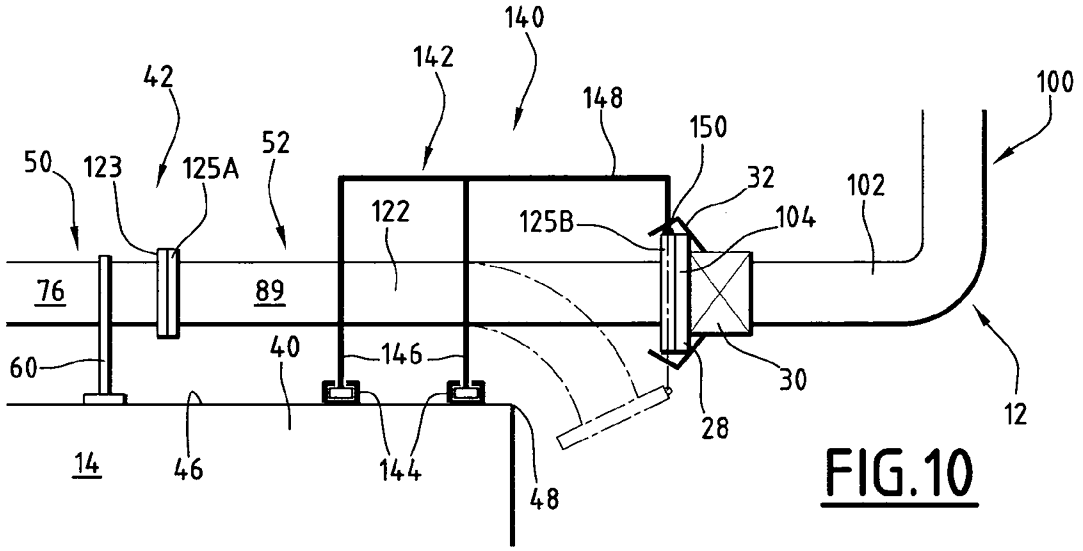
FIG. 10 is a view similar to FIG. 4 of a third transfer device according to the invention.
Figure 11:
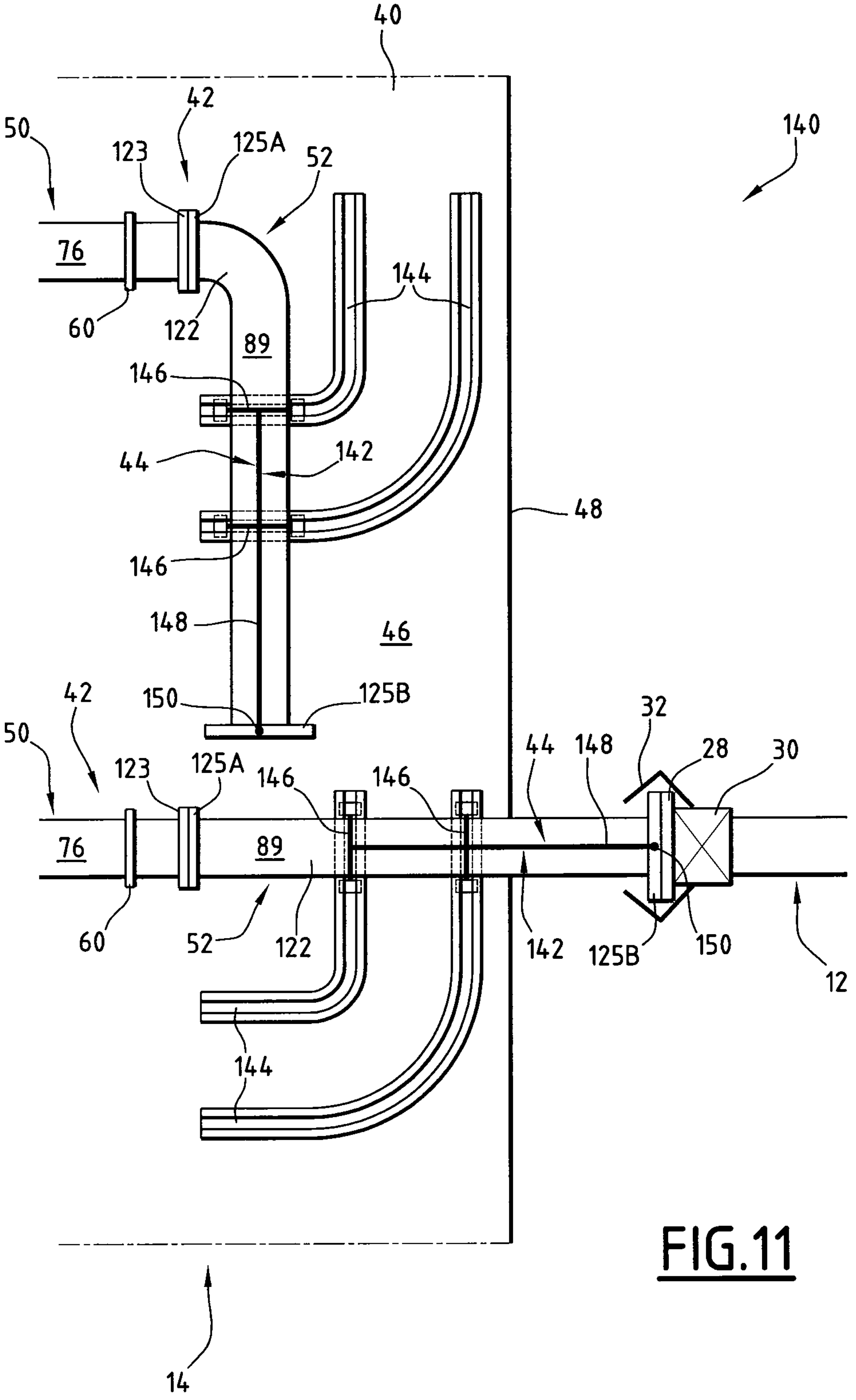
FIG. 11 is a top view of the transfer device shown in FIG. 10.

A third transfer device 140 is shown in FIGS. 10 and 11. Differing from the second transfer device 120, the handling means 44 comprise a carriage 142 for supporting the flexible pipe 122 and rails 144 for movement of the carriage 142.

The carriage 142 comprises guide legs 146, slidingly engaged in the rails 144 and a handling arm 148 extending parallel to the axis X-X' above and opposite the free end 125B of the flexible hose 122. The arm 148 is equipped with a winch 150 for moving the free end 125B in a vertical plane.

The rails 144 are fixed onto the platform 40 to define a curved guide path with axis locally perpendicular to the carriage 142. The carriage 142 is thus movable along the rails 40 between a configuration for usage of the length of connecting tube 52 shown at the bottom in FIG. 11, and a configuration for retraction of the length of tube 52 shown at the top in FIG. 11.

In the usage configuration, the carriage 142 extends approximately parallel to the axis X-X' and holds the flexible hose 122 in a plane approximately transverse to the ship. In the retraction configuration, the carriage 142 holds the flexible hose 122 in a bent rest configuration, in which the free end 125B is located opposite the platform 40 and is offset longitudinally between the free ends 125B of two parallel manifolds 42. In this configuration, all of the flexible hose 122 is located inside the outer edge 48, thereby maintaining the length of connecting tube 52 in its retracted rest position.

In order to bring the length of connecting tube 52 from its rest position to its first or second filling position, the carriage 142 is moved from its retraction configuration to its usage configuration in which the flexible hose 122 is disposed along the axis X-X'. The flexible hose 122 thus moves in an approximately horizontal plane swept by the carriage 142.

In this position of the carriage 142, the length of connecting tube 52 is in its second filling position, in which the free end 125B extends along the axis X-X'

In order to bring the length of connecting tube 52 into its first filling position, the winch 150 is actuated to lower the free end 125B downwards, and bend the flexible hose 122 downwards in a vertical plane, as illustrated by dotted lines in F*igure* 10.

As a variant, and as for the second transfer device 120, a stiffening assembly 132 may be mounted on the flexible hose 122.

Figure 12:
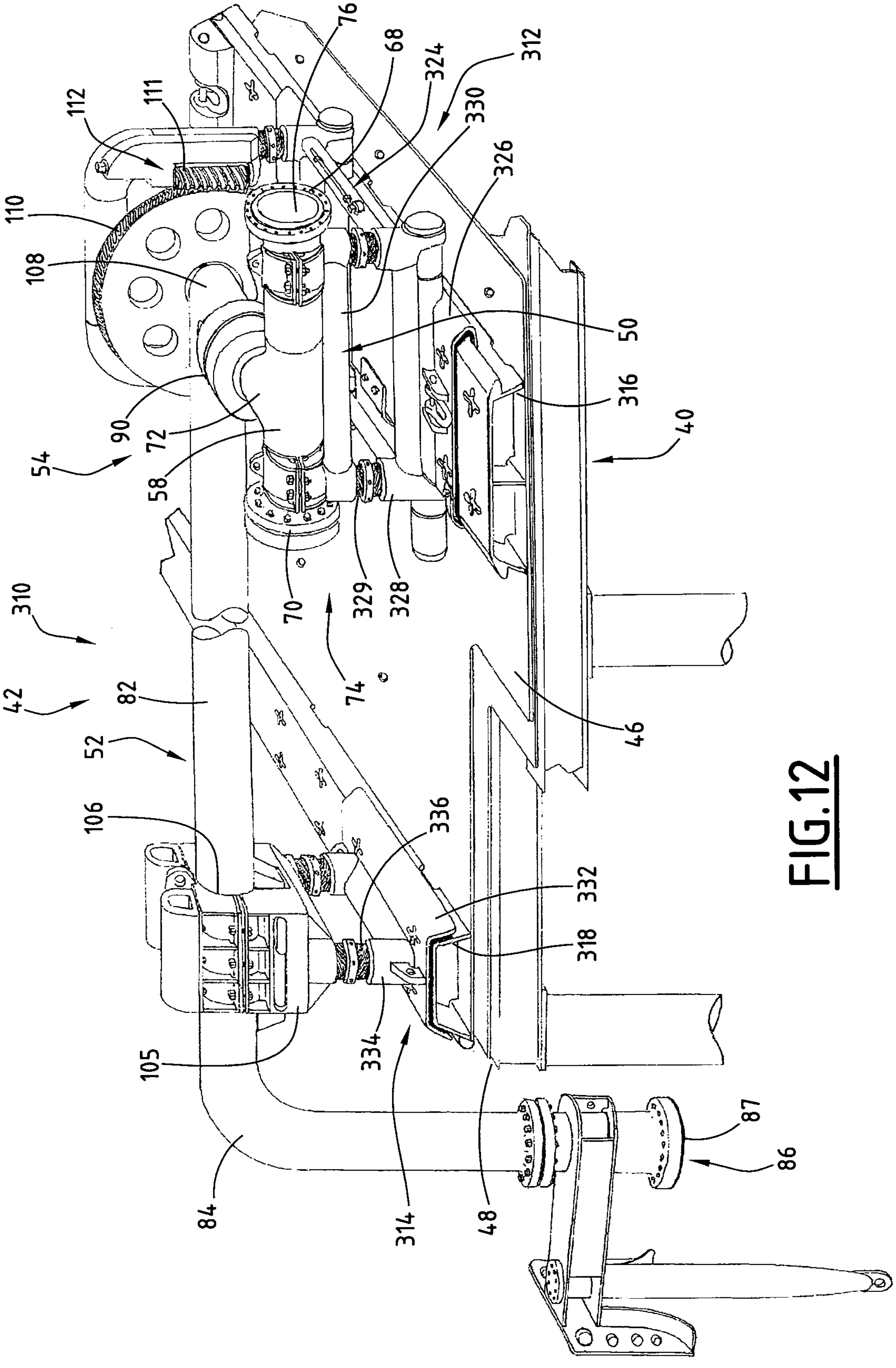
FIG. 12 is a view similar to FIG. 6 of another variant of the first transfer device.
Figure 13:
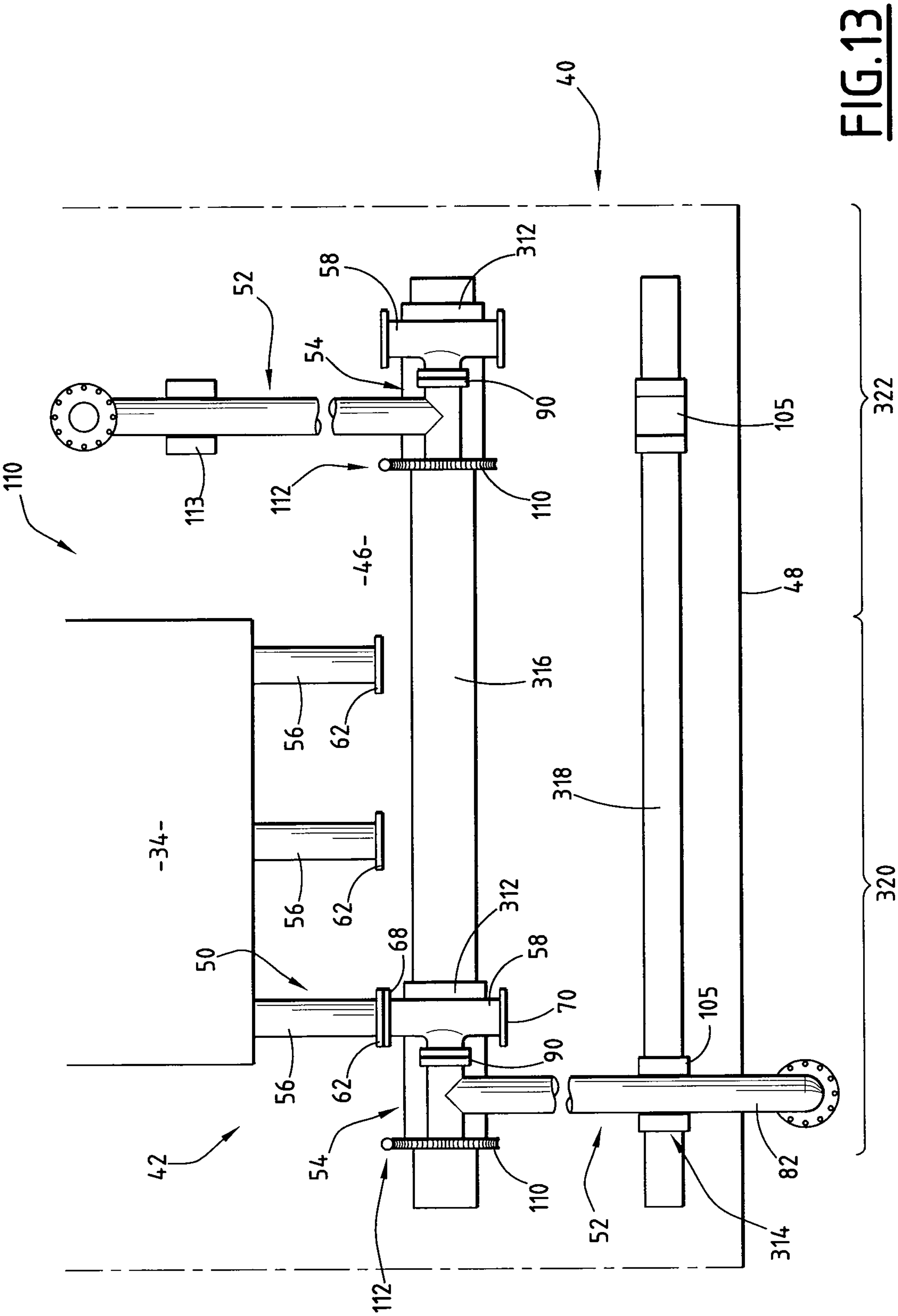
FIG. 13 is a top view of the device of FIG. 12.

A fourth transfer device 310 according to the invention is illustrated in FIGS. 12 and 13. The device 310 is a variant of the first transfer device shown in FIG. 6.

Differing from the device shown in FIG. 6, the transfer device 310 comprises a fixed inner tubular element 56, connected to the tank 34, and an outer tubular element 58 movable on the support surface 46 of the platform 40, being carried on a main conveying carriage 312 and on an auxiliary conveying carriage 314.

To this end, the ship 14 comprises a plurality of tubular elements 56 located parallel to one another on one edge of the ship 14.

The support surface 46 comprises an inner guide rail 316 for guiding the movement of the main conveying carriage 312 and an outer guide rail 318 for guiding the auxiliary conveying carriage 314.

The inner rail 316 extends axially relative to the ship 14, parallel to the lateral edge 48, between a usage region 320, located opposite the tanks 34 and the inner tubular elements 56, and a storage region 322, located axially away from the inner tubular elements 56.

The inner rail 316 extends in the region of the fixing flanges 62 of the inner tubular elements 56 between the elements 56 and the outer rail 318. The outer rail 318 extends in the region of the lateral edge 48 of the ship.

As illustrated in FIG. 12, the main carriage 312 comprises a support frame 324 for the outer tubular element 58 and a slide 326 for guiding on the rail 316, carrying the frame 324.

The frame 324 has legs 328 for fixing on the slide 326 and equipped with damping discs 329, and a support cradle 330 for the inner tubular element 56, supported by the legs 328. The cradle 330 carries on one side the tubular element 58 and on the other side the means 54 for articulation of the length of connecting tube 52 including the revolving joint 90, the rotating shaft 108, the toothed pinion 110 and the drive means 112 for the toothed pinion.

The slide 326 is engaged around the inner rail 316 in order to guide the movement of the conveying carriage 312 longitudinally relative to the ship along the rail 316.

The auxiliary carriage 314 also comprises a slide 332 engaged on the outer rail 318, and two legs 334 equipped with damping discs 336.

The legs 334 carry the support block 105 for the length of connecting tube 52. When the length of connecting tube 52 is in its first filling position, the assembly formed by the outer tubular element 58 and the length of connecting tube 52 is movable longitudinally along the ship 14, by means of the main conveying carriage 312 and the auxiliary conveying carriage 314, between a usage position connected to an inner tubular element 56, shown on the left in FIG. 13, and a storage position located away from each inner tubular element 56 and shown on the right in FIG. 13.

In the usage position, the outer tubular element 58 is attached by its inner flange 68 to the fixing flange 52 of the inner tubular element 56. The outer tubular element 58 is then positioned in the usage region 320 which extends opposite the parallel inner tubular elements 56. In this configuration, the transfer line 22 may be connected either onto the flange 87 of the length of connecting tube 52, or onto the outer flange 70 of the outer tubular element 58, depending on the nature of the transport line 22 to be connected.

In the storage position, the carriages 312, 314, the outer tubular element 58 and the length of connecting tube 52 are disposed in the storage region 322 in which a free space is available away from the axial prolongation of the inner tubular elements 56, towards the centre of the ship.

In this configuration, the length of connecting tube 52 has been manoeuvred by the articulation means 54 so as to be rotated through around 180° about the longitudinal axis and placed in a retaining housing 113. Thus, it assumes its rest position totally retracted inside the outer edge 48.

The operation of the fourth installation 310 comprises an initial step of bringing the length of tube 52 stored in the storage region 322 from its rest position to its first filling position, by pivoting it through 180° towards the outside of the ship, about a longitudinal axis, by means of the revolving joint 90.

The length of connecting tube 52 is then introduced into the groove 106 of the support block 105 carried by the auxiliary carriage 314. Then, the assembly formed by the auxiliary carriage 314, the main carriage 312, the outer tubular element 58 and the length of connecting tube 52 is moved longitudinally on the support surface 46 by sliding of the respective slides 326, 332 on the respective rails 316, 318.

This assembly is then brought into the usage position, such that the inner flange 68 of the tubular element 58 is positioned facing the outer flange 62 of an inner tubular element 56. The flanges 68, 62 are then firmly fixed to one another by screwing. The transport line 22 is connected onto one or the other of the outer flanges 87, 70, depending on its nature.

The invention claimed is:

1. A device for transferring a fluid to a ship, the device comprising:

a support platform delimiting a support surface having an outer edge; and a manifold disposed above the support surface and configured to be connected to a fluid tank located on the ship, the manifold comprising:

a length of a rigid tube having an outer end, an outer flange extending at the outer end in a plane transverse to the support surface, the rigid tube having a length delimiting an inner pipe with an axis in a region of the outer end, the axis being parallel to the support surface; and a length of a connecting tube, connected to the length of the rigid tube, the length of the connecting tube having a free end configured for projecting out beyond the outer edge in order to be connected to a first fluid transfer line, and delimiting an inner passage connecting to the inner pipe and opening at the free end;

wherein the length of the connecting tube is permanently attached to the length of the rigid tube and is hinged onto the length of the rigid tube in order to be movable in relation to the length of the rigid tube between:

a retracted rest position in which the length of the connecting tube extends entirely inside the outer edge; and a first filling position, in which the free end of the length of the connecting tube projects out beyond the outer edge.

2. The device according to claim 1, wherein in the first filling position, the inner passage has an axis inclined downwards in the region of the free end of the length of the connecting tube.

3. The device according to claim 1, wherein the length of the connecting tube is movable relative to the length of the rigid tube approximately in a vertical plane between the rest position and the first filling position.

4. The device according to claim 1 wherein the length of the connecting tube is movable relative to the length of the rigid tube in a plane parallel to the supporting surface between the rest position and the first filling position, the manifold comprising a carriage for supporting the length of the connecting tube, the carriage mounted to be movable on the support surface.

5. The device according to claim 1, wherein the length of the connecting tube is hinged on the length of the rigid tube at a branching point located on an inside relative to the outer end of the length of the rigid tube, the length of the rigid tube comprising an end extension of non-zero length extending between the branching point and the outer end of the length of the rigid tube and the length of the rigid tube has at the outer end an additional end-piece configured for connection to a second fluid transfer line, the inner pipe opening to the outside at the outer end.

6. The device according to claim 5, wherein the length of the connecting tube in its first filling position comprises a portion extending approximately parallel to the end extension of the length of the rigid tube.

7. The device according to claim 1, wherein the length of the rigid tube comprises an inner tubular element, intended to be connected to the fluid tank, an outer tubular element mounted to be movable on the support surface between a storage position away from the inner tubular element and a usage position connected to the inner tubular element, at least one conveying carriage movable on the support surface and carrying the outer tubular element between its storage position and its usage position, the length of the connecting tube being hinged on the outer tubular element.

8. The device according to claim 1, wherein the length of the connecting tube is formed by a flexible hose, the flexible hose being flexible over approximately the entire length of the flexible hose.

9. The device according to claim 8, wherein the flexible hose is permanently attached to the outer end of the length of the rigid tube, the length of the connecting tube being configured for assuming a second filling position, in which an axis of the length of the connecting tube in a region of the free end of the length of the connecting tube extends parallel to the support surface.

10. The device according to claim 8, wherein the length of the connecting tube comprises a stiffening assembly attached to the flexible hose in order to limit curvature of the flexible hose in a region of the free end.

11. The device according to claim 10, wherein the stiffening assembly comprises a plurality of vertebrae hinged to one another by controlled articulations, the controlled articulations being capable of assuming a rest configuration in which the vertebrae are immobilized relative to one another and a release configuration in which the vertebrae are movable relative to one another.

12. The device according to claim 1, wherein the length of the connecting tube comprises a rigid tubular element mounted to be movable on the length of the rigid tube via an articulation means.

13. The ship for transporting the fluid, wherein the ship comprises the fluid tank, and the transfer device according to claim 1, the outer edge of the support platform delimiting partially an outer edge of the ship, the space below the free end of the length of the connecting tube in its first filling position being totally clear.

14. An assembly for transferring the fluid, comprising:

a fluid transfer installation located in contact with a stretch of water and comprising the first fluid transfer line;

the ship according to claim 13, floating on the stretch of water, the first fluid transfer line being connected to the free end of the length of the connecting tube.

15. A method for transferring the fluid to the ship in the assembly according to claim 14, the method comprising the following steps:

moving the ship towards the transfer installation, while the length of the connecting tube is in its retracted rest position;

positioning the ship facing the transfer installation and moving the length of the connecting tube from its rest position to its first filling position; and connecting the first fluid transfer line of the transfer installation to the free end of the length of the connecting tube.

* * * * *

UNITED STATES PATENT AND TRADEMARK OFFICE

CERTIFICATE OF CORRECTION

PATENT NO. : 8,539,970 B2
APPLICATION NO. : 12/595689
DATED : September 24, 2013
INVENTOR(S) : Thomas et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1017 days.

Signed and Sealed this
Fifteenth Day of September, 2015

Michelle K. Lee

Michelle K. Lee
*Director of the United States Patent and Trademark Office*